United States Patent [19]

Hayner

[11] Patent Number: 4,664,135

[45] Date of Patent: May 12, 1987

[54] PILOT VALVE

[75] Inventor: Paul F. Hayner, Merrimack, N.H.

[73] Assignee: Sanders Associates, Inc., Nashua, N.H.

[21] Appl. No.: 638,180

[22] Filed: Aug. 6, 1984

Related U.S. Application Data

[63] Continuation-in-part of Ser. No. 607,479, May 7, 1984, abandoned.

[51] Int. Cl.[4] .................... G05D 16/00; F16K 31/06

[52] U.S. Cl. .............................. 137/82; 137/625.64; 251/129.1

[58] Field of Search .................... 137/625.62, 625.64, 137/596.17, 625.28; 251/DIG. 2, 137, 129.09, 129.1

[56] References Cited

U.S. PATENT DOCUMENTS

| | | | |
|---|---|---|---|
| 19,203 | 1/1858 | Osgood . | |
| Re. 27,758 | 9/1973 | Byers . | |
| 1,138,994 | 5/1915 | Steele . | |
| 2,896,588 | 7/1959 | Hayner et al. . | |
| 3,096,690 | 7/1963 | Hayner . | |
| 3,178,151 | 4/1965 | Caldwell | 251/137 |
| 3,446,229 | 5/1969 | Howland | 137/85 |
| 3,561,488 | 2/1971 | Byers . | |
| 3,690,344 | 9/1972 | Brumm . | |
| 3,771,563 | 11/1973 | Hayner | 251/DIG. 2 |
| 3,893,484 | 7/1975 | Greene . | |
| 3,910,310 | 10/1975 | Hayner . | |
| 3,943,957 | 3/1976 | Hayner . | |
| 3,994,314 | 11/1976 | Hartley . | |
| 4,050,476 | 9/1977 | Hayner et al. . | |
| 4,182,368 | 1/1980 | Hartley | 251/DIG. 2 |

FOREIGN PATENT DOCUMENTS 983 of 1854 United Kingdom .

*Primary Examiner*—Alan Cohan
*Attorney, Agent, or Firm*—Louis Etlinger; Stanton D. Weinstein

[57] ABSTRACT

A pilot valve suited for use as the first stage of a large hydraulic valve system. The pilot valve virtually eliminates the steady state fluid leakage associated with orifice-based prior art systems. A pair of low noise and long life fluid restrictors are employed having flat openings thereto over which a flexible metal strip is disposed. The ends of the strip adjacent each opening are attached to one edge of rolling members whereby they can be rolled progressively off of and over the openings by an electrically driven actuator. In this manner, fluid flow through the two restrictor paths are controlled simultaneously to change the amount of fluid passing therethrough. Taps are provided in each restrictor for taking out the control fluid flow and pressure which are applied to the main valve as the driving means thereto.

21 Claims, 30 Drawing Figures

PILOT VALVE

This is a Continuation-In-Part of application Ser. No. 607,479 filed May 7, 1984, now abandoned.

BACKGROUND OF THE INVENTION

The present invention relates to pilot valves for hydraulic systems and, more particularly, to a pilot valve employing a thin metal strip which is rolled onto and off of the openings of a pair of restrictor paths to replace conventional nozzle openings.

An actuator valve system as used in a submarine for such uses as moving the diving planes is shown in simplified form in FIG. 1 and generally indicated as 10. A large, heavy duty actuator 11 having a piston ram 12 is connected by actuator rod 13 to the diving plane 14. As the actuator rod 13 is moved in the direction of the arrow 15, the diving plane 14 is rotated as indicated by the arrows 16. When the ram 12 and actuator rod 13 are held in a fixed position, the plane 14 is also held in its then attained position and resists movement therefrom. The motive and holding power for the ram 12 is provided by a hydraulic source 17. Because of the sizes, volumes, and pressures involved, the flow of hydraulic fluid between the source 17 and the actuator 11 through lines 18 (in the directions indicated by the arrows for "supply" and "return") is controlled by the high flow, four-way actuator valve 19 containing spool piston 20 sealably and longitudinally slideably disposed therein. As the spool piston 20 is moved in either direction, there is a corresponding change in the flow of hydraulic fluid to the actuator 11. Hydraulic lines 18 are connected at opposite ends of the cylindrical housing of actuator 11 and hydraulic fluid at changeable pressures $P_L$ and $P_R$ is introduced into the cylindrical housing to move the piston ram 12. When the pressures $P_L$ and $P_R$ are equal, the ram 12 remains in a static position. If pressure $P_L$ exceeds pressure $P_R$, the ram 12 is moved to the right as FIG. 1 is viewed. Pressure $P_R$ exceeding pressure $P_L$, of course, causes the ram 12 to move to the left as the picture is viewed.

In a system such as 10 used on submarines for moving diving planes and the like, it is quite typical to further interpose a pilot valve such as that indicated as 24 to control the input of hydraulic fluid to the actuator valve 19 so as to move the spool piston 20 in response to an electrical control signal. Such a prior arrangement is shown in FIG. 2. The working portions of a pilot valve according to the prior art are generally indicated as 24. Pilot valve 24 comprises a pair of opposed control nozzles 26 having a moveable flapper 28 therebetween. Each control nozzle 26 comprises an inlet pipe 30 through which the hydraulic fluid 22 (supplied by source 17 on line 18) enters. The fluid 22 passes through an orifice plate 32 which causes a fluid pressure drop depending on the velocity of the fluid passing therethrough. Past the orifice plate 32, the control nozzle 26 has an orifice outlet opening 34 disposed adjacent the moveable flapper 28 and an outlet pipe 36 which is adapted to connect to a respective one of the hydraulic input lines of the actuator valve 19.

As can be seen, the orifice outlet openings 34 are disposed in facing relationship on opposite sides of the moveable flapper 28. Flapper 28 is pivoted at 38 and can be moved in either direction, as indicated by the arrows 40, by the in and out movement of electrically driven motor armature 42 in response to an electrical control signal input on lines 44. As depicted in the enlarged drawing of FIG. 3, as fluid 22 under pressure $P_{in}$ attempts to exit through the orifice outlet opening 34, the positioning of the flapper 28 tends to impede the flow of fluid 22 through opening 34, depending upon the positioning of the flapper 28. The closer the flapper 28 is to the outlet opening 34, the greater the back pressure created upon hydraulic fluid 22. This, in turn, causes the flow rate through the orifice plate 32 to decrease and the pressure within the outlet pipe 36 to increase. As the moveable flapper 28 is moved by the electrical actuator 42 away from an outlet opening 34, the hydraulic fluid 22 can move more easily therethrough, the flow rate through the orifice plate 32 increases, and the pressure within the outlet pipe 36 decreases. The symmetrical and opposing arrangement of the nozzles 26 with the flapper 28 results in an output differential pressure (the absolute value of P1-P2) which is a function of the motion of flapper 28. The differences (or identity) in pressures P1 and P2 which are applied on opposite ends of the spool piston 20 cause piston 20 to be moved or held stationary just as ram 15 was controlled by pressures $P_L$ and $P_R$.

Within a modern nuclear submarine, the foregoing operation of the prior art pilot valves causes two problems. First, there is a constant flow of hydraulic fluid 22 through the orifice outlet openings 34 of the control nozzles 26. Thus, there is always an amount of leakage hydraulic fluid 22 passing into a sump region which must be recycled. Additionally, the flow of the hydraulic fluid 22 through the control nozzles 26 is noisy. Noise, of course, is undesirable since it allows enemy vessels to locate and track the submarine.

Wherefore, it is the object of the present invention to provide a pilot valve for use in hydraulic systems, primarily for use aboard submarines, in which the steady state leakage problem is virtually eliminated and in which the noise attendant to the operation thereof is reduced to a minimum.

SUMMARY

The foregoing objectives have been met by the pilot valve of the present invention for receiving fluid from a source at a pressure P at an inlet thereof and for delivering fluid at changeable reduced pressures P1 and P2 at respective ones of a pair of outlets in response to an electrical control signal thereto wherein the valve comprises a housing including a chamber having the inlet communicating therewith and having a pair of outlets therefrom; first fluid restrictor means having an inlet connected to one of the housing outlets, an outlet, and a tap therebetween for delivering a portion of fluid passing therethrough between the inlet and outlet thereof at the reduced pressure P1 at the tap thereof; second fluid restrictor means having an inlet connected to the other of the housing outlets, an outlet and a tap therebetween for delivering a portion of fluid passing therethrough between the inlet and outlet thereof at the reduced pressure P2 at the tap thereof; first valve means disposed over the inlet of the first fluid restrictor means for controlling the amount of fluid entering the first fluid restrictor means from the chamber; second valve means disposed over the inlet of the second fluid restrictor means for controlling the amount of fluid entering the second fluid restrictor means from the chamber; and, actuator means operably connected to the first and second valve means and having an input adapted to receive the electrical control signal for moving the first and second valve means in combination in response to the electrical control signal, the actuator means being connected such that as one of the valve means is moved in a direction tending to increase the flow of fluid therethrough, the other of the valve means is moved in a direction tending to decrease the flow of fluid therethrough.

In the preferred embodiment of the present invention, the first and second valve means are disposed within the chamber.

In the preferred embodiment, the first and second valve means each include a flexible strip adapted to be progressively rolled over and off of the inlet thereof.

DESCRIPTION OF VARIOUS EMBODIMENTS

Figure 4:
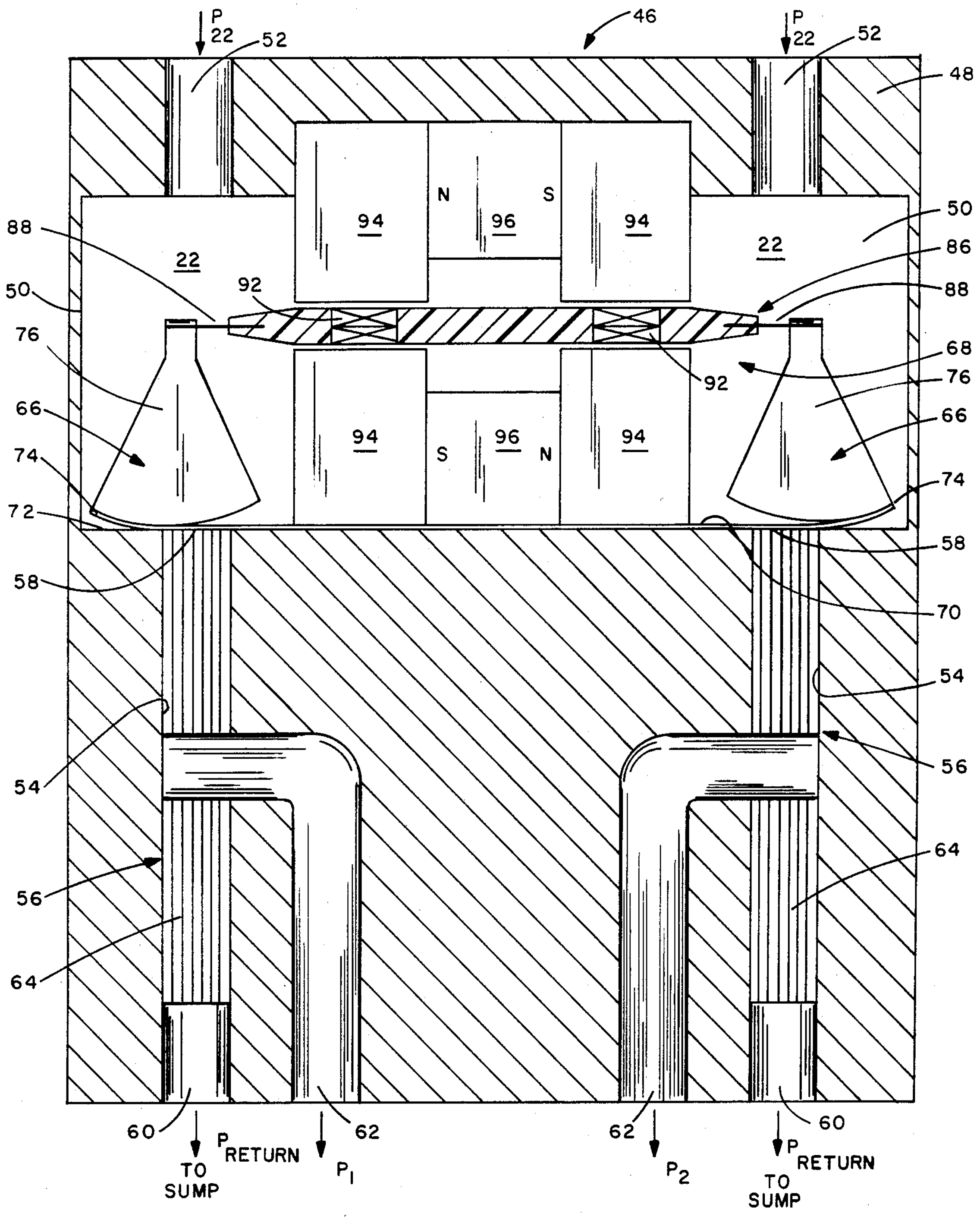
FIG. 4 is a simplified cutaway elevation of a pilot valve according to the present invention.

Turning first to FIG. 4, the pilot valve of the present invention is shown in simplified form and generally indicated as 46. Pilot valve 46 generally comprises a housing 48 having a chamber 50 therein. The hydraulic fluid 22 at inlet pressure P enters the chamber 50 through inlet openings 52. The housing 48 also includes a pair of conduits 54, each containing a fluid restrictor 56 having an inlet opening 58 communicating with the chamber 50 on one end, an outlet opening 60 on the other end, and a tap outlet opening 62 between the two from which pressures P1 and P2, respectively, are obtained. The fluid restrictors 56 comprise a plurality of restrictor plates 64 such as those described in the reissue patent U.S. Pat. No. Re. 29,714 to Paul F. Hayner and Richard J. Brockway entitled FLUID FLOW RESTRICTOR which is assigned to the common assignee of this application. The restrictor plates 64 define a tortuous path such that as the hydraulic fluid 22 flows therethrough from the inlet opening 58 to the outlet opening 60, a continual, distributed, virtually noise-free pressure drop is effected.

To effect the necessary control, each of the inlet openings 58 is covered with a valve, generally indicated as 66, which is controlled by an electrical actuator, generally indicated as 68, in order to progressively open and close the inlet openings 58 in combination. As will be seen in the more detailed description which follows hereinafter, the valves 66 are connected to the actuator 68 such that as one opens, the other remains closed; that is, in the neutral position of FIG. 4 both valves 66 are closed and, as will be more fully appreciated from the description which follows hereinafter, the valves 66 move in combination such that only one at a time opens.

Figure 1:
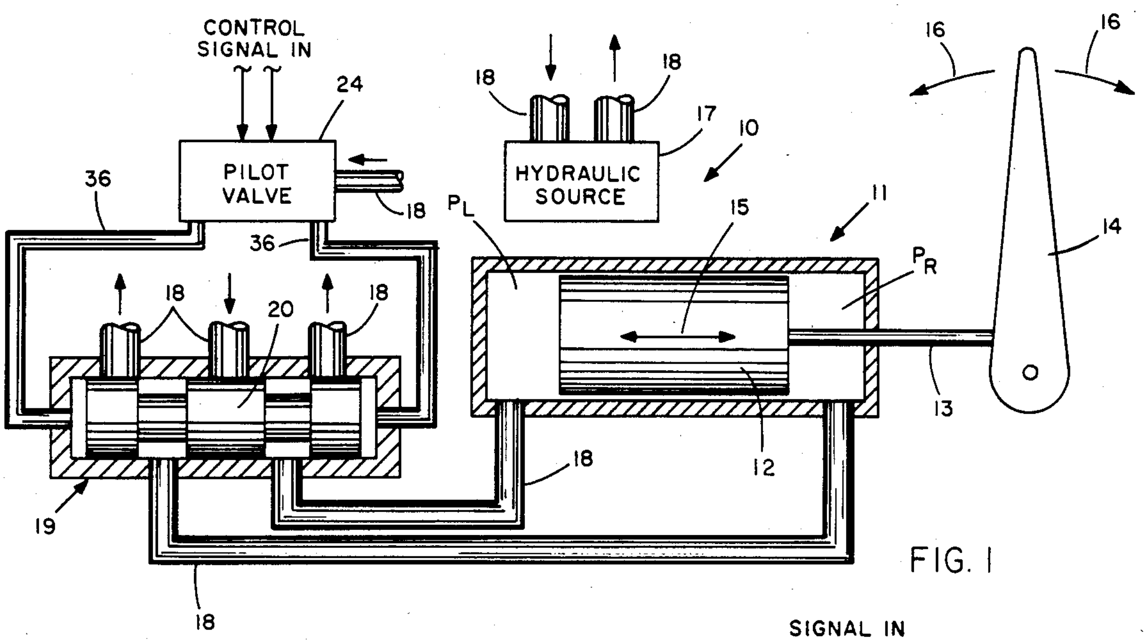
FIG. 1 is a simplified cutaway drawing of an actuator valve as wherein the present invention is used.
Figure 2:
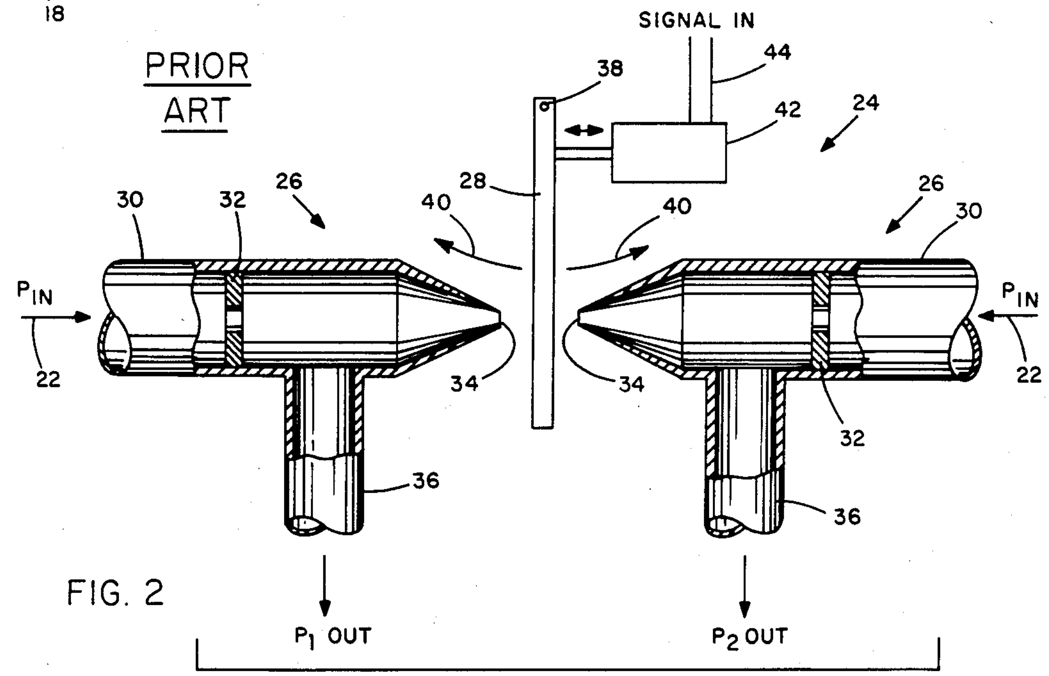
PRIOR ART FIG. 2
FIG. 2 is a simplified, partially cutaway drawing of a prior art pilot valve.
Figure 3:
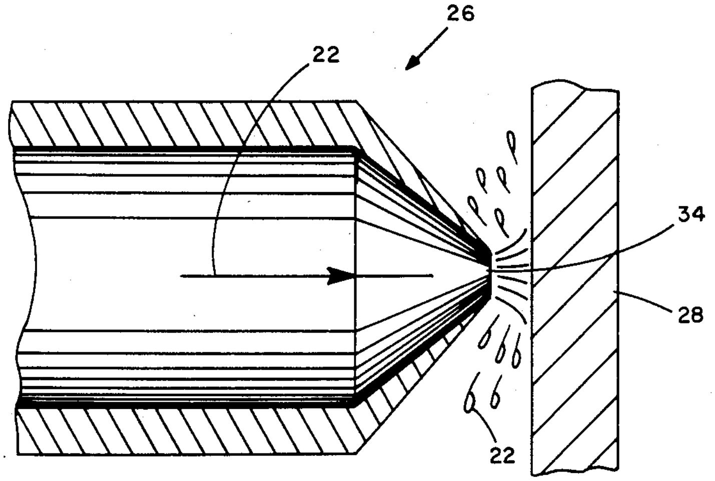
PRIOR ART FIG. 3
FIG. 3 is an enlarged drawing of one of the control nozzles of the pilot valve of FIG. 2.

In contrast to the prior art valve arrangement of FIG. 2, which maintained a constant flow of hydraulic fluid 22 at the neutral position, in the present invention, as can be seen in FIG. 4, with both the valves 66 in a closed position blocking fluid flow through the fluid restrictors 56 in the neutral position, fluid leakage at neutral is virtually eliminated.

Figure 5:
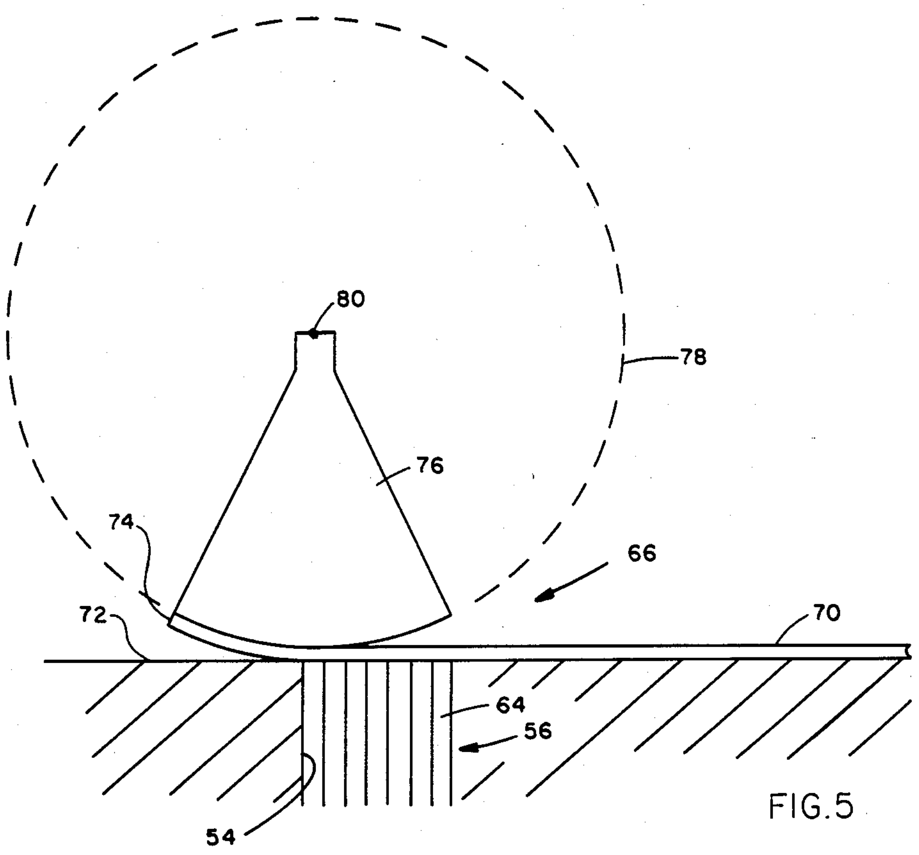
FIG. 5 is a simplified drawing of the flexible metal strip controlling the inlet to each restrictor path in the valve of the present invention.
Figure 6:
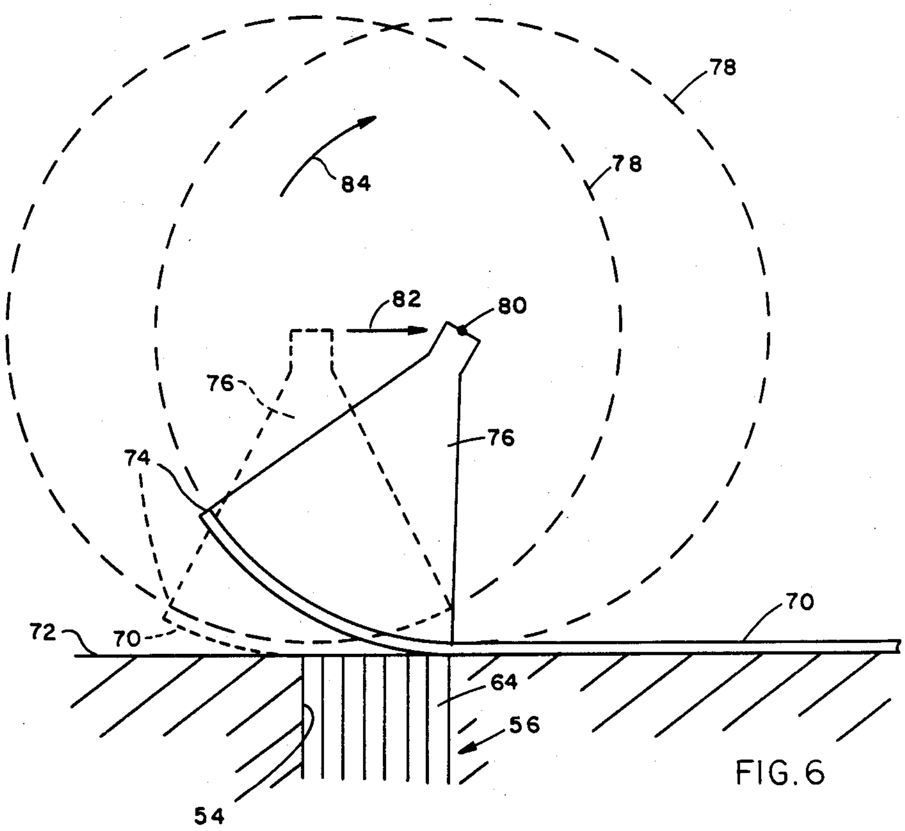
FIG. 6 is a drawing showing the manner in which the metal strip is rolled onto and off of the inlet opening to the restrictors.

Turning now to FIGS. 5 and 6 in combination with FIG. 4, the operation of valves 66 to effect the desired objectives of the present invention will be described in greater detail. The actual progressive opening and closing of the inlet openings 58 is accomplished by a thin metal strip 70 adapted to be "peeled" off of and back onto the inlet openings 58 as they emerge into chamber 50 at the flat bottom surface 72 thereof. The outermost ends of the metal strip 70 are fastened at 74 as by welding along the edge of a rolling actuator 76 which comprises a wedge segment from a cylinder, indicated by the dotted circle 78 in FIGS. 5 and 6. The center of the "cylinder" is indicated at 80 and appears at the top edge of the actuator 76. As can be seen in FIG. 6, if the top of the actuator 76 is displaced to the right as indicated by the arrow 82, the "cylinder" will roll to the right as indicated by the arrow 84 progressively "peeling" the metal strip 70 off of the inlet opening 58 to the fluid restrictor 56. If rolled to the left, the inlet opening 58 would, of course, remain closed.

Turning back principally to FIG. 4, it can be seen that the tops of the two actuators 76 are interconnected by an actuator member 86. As a consequence, the two actuators 76 are "rolled" in combination with one moving in the opening direction as the other moves in the closed direction. It should be noted at this point that the operation of the pilot valve 46 of the present invention is slightly different from that of the prior art valve 24 of FIG. 2. The prior art pilot valve 24 operated on a differential in pressure between P1 and P2; that is, by the nature of the valve 24, there was constant flow of the hydraulic fluid 22 through both control nozzles 26 and, therefore, it was the differential in pressure between P1 and P2 which effected a displacement of the piston 14. By contrast, in the valve 46 of the present invention, only one valve 66 at a time is opened such that either pressure P1 or P2 (but not both) is applied to its respective side of the piston 14 to effect movement. At the end of the control/movement period when the electrical signal goes back to neutral, the pilot valve 46 of the present invention returns to its neutral position of FIG. 4 wherein both valves 66 are closed. Thus, when it is described that the two valves move in combination so that one opens and the other closes, in actuality what happens is in moving towards the closed position from neutral, one valve 66 simply remains in the closed position during a minor rotation of the actuator 76 in the "closed" direction while the opposite valve is actually being opened. Only as the actuator member 86 passes through the neutral position, does one valve 66 switch from an open position to a fixed closed position and the opposite switch from a fixed closed position to an opening position.

Figure 7:
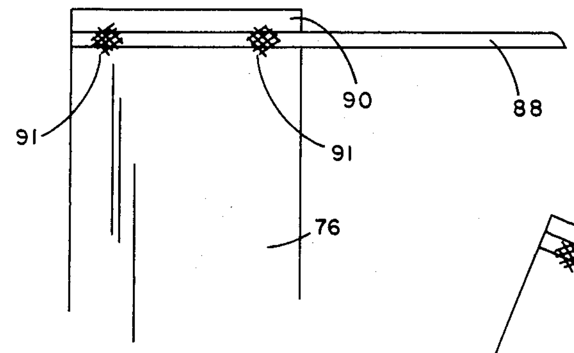
FIGS. 7 and 8 show the manner in which the connection between the electrical activator and the rolling valve actuator flexes during movement thereof.
Figure 8:
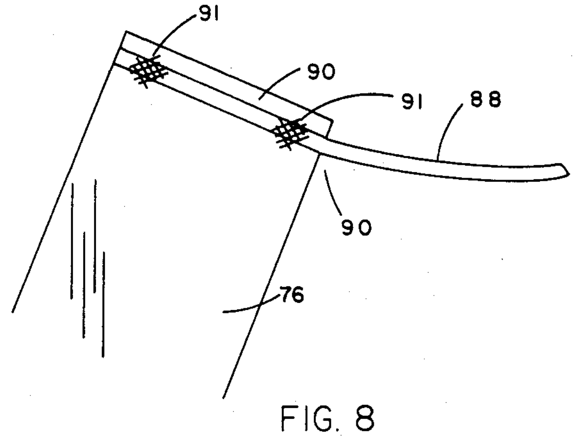

Turning briefly to FIGS. 7 and 8, it can be seen that the ends of the actuator member 86 are attached to the tops of the rolling actuators 76 by a flexible connecting strip 88. Strip 88 flexes to compensate for the slight degree of movement between the point of attachment and the pure translational motion of the cylinder center 80 at the top of the rolling actuator 76. The flexible connecting strips 88 can be conveniently attached to the top edge of the actuator 76 by sandwiching them between top pieces 90 connected to the actuators 76 as at 91 by welding or the like.

Figure 11:
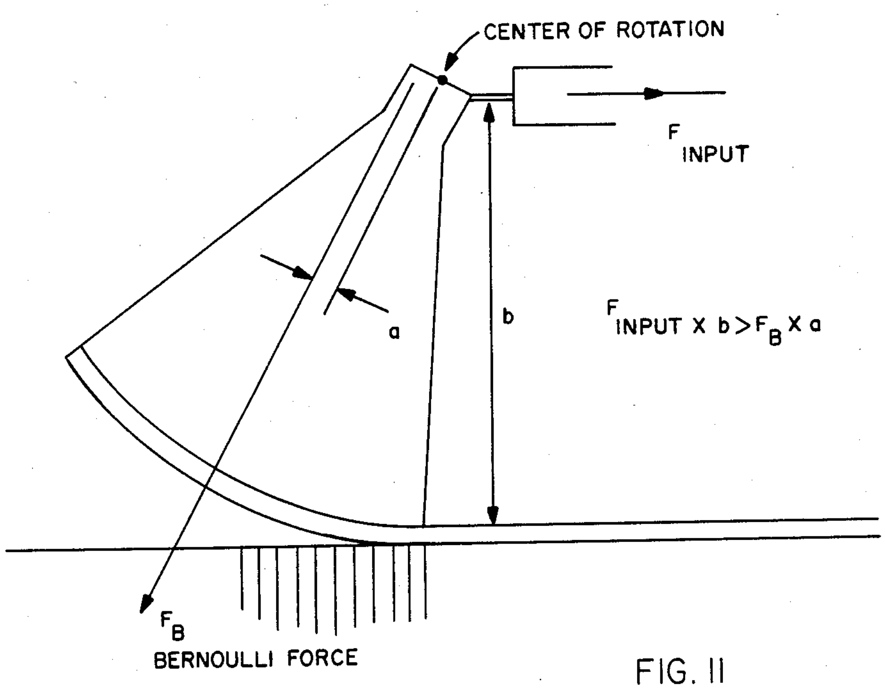
FIG. 11 is a drawing showing the forces acting on the rolling actuator of the present invention during its rolling opening action.
Figure 13:
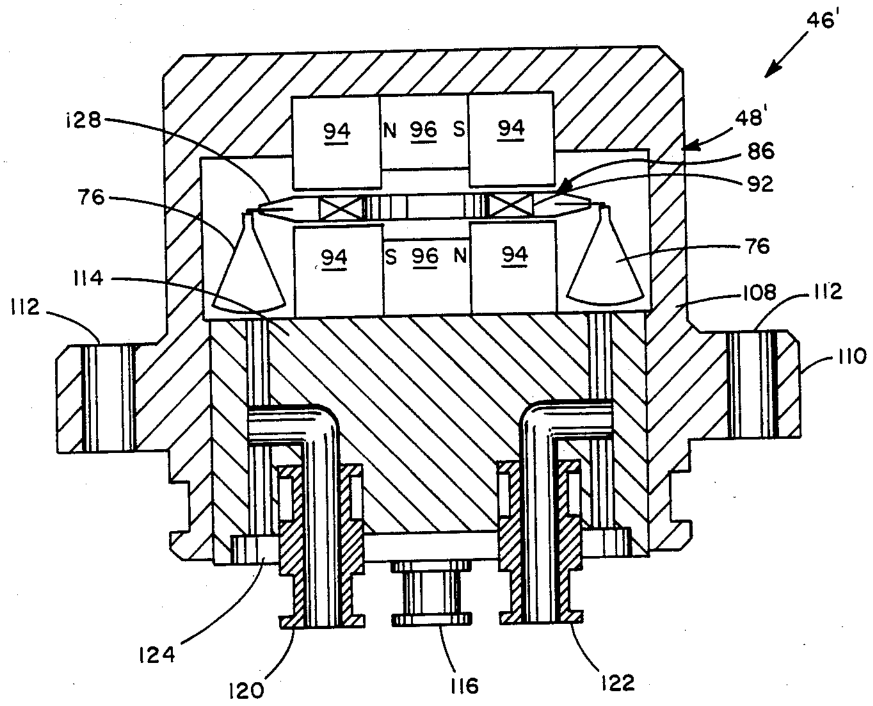
FIG. 13 is a cutaway elevation of the valve of FIG. 12 in the plane XIII—XIII.
Figure 12:
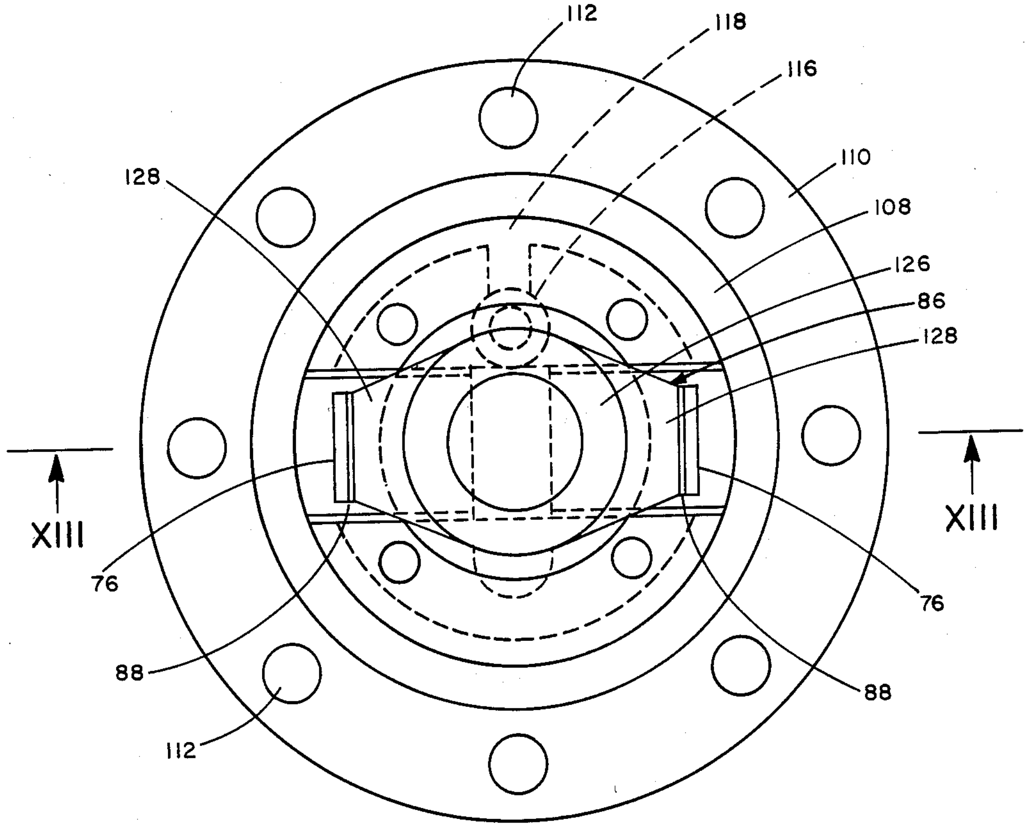
FIG. 12 is a plan view of a pilot valve of the present invention in an alternate embodiment.

Returning now to FIG. 4, it can further be seen that the actuator member 86 contains a pair of upper and lower coils 92 adapted to be connected by wires therefrom (not shown) which emerge from the housing 48 and are adapted to be connected to the source of the variable d.c. electrical control signal. The actuator member 86 is positioned between a pair of pole pieces 94 carrying the magnetic flux from a pair of samarium cobalt magnets 96. Thus, as current is passed through the coils 92 in one direction, the actuator member 86 is driven longitudinally towards one of the rolling actuators 76 proportionally to the control signal. When the current direction is reversed, the actuator member 86 is driven proportionally in the opposite direction. When the current is stopped, the restorative force of the metal strip 70 biases the actuator member 86 and rolling actuators 76 to the neutral position of FIG. 4. The restorative force on the metal strip 70 is a combination of the resiliency of the strip 70 in combination with the force of the fluid 22 trying to enter the inlet openings 58. It is also worthy of note at this time that the force on the actuator member 86 required to be produced by the magnets 96 and coil 92 to effect the opening of the valves 66 is minimal because of the rolling or "peeling" progressive opening action of the metal strip 70 as it is rolled off of and onto the inlet openings 50 and the leverage of the rolling actuator 76 as shown in FIG. 11. Since the restrictors 56 are comprised of a plurality of adjacent plates 64, the amount of force required to roll the metal strip 70 off one plate's openings is minimal. Once the openings have been exposed, the fluid pressure on either side of the plate 70 at that point is equalized. Thus, virtually the only force required is that necessary to expose one restrictor plate 64 at a time.

Figure 9A:
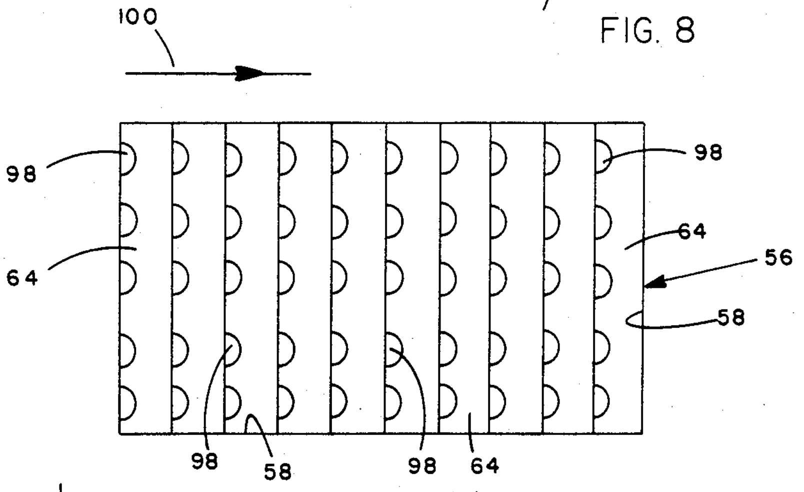
FIG. 9(*a*), (*b*) and (*c*) are drawings showing the correlation between the stacked restrictor plates employed in the pilot valve of the present invention and the Bernoulli force tending to close the valve thereof as the opening to the various plates is progressively accomplished.
Figure 9B:
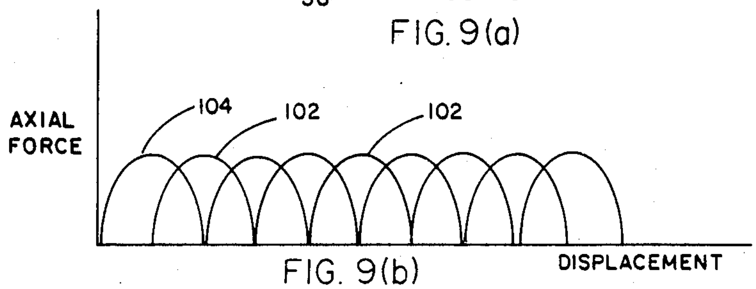
Figure 9C:
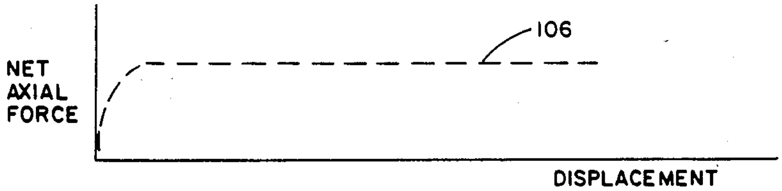
Figure 10A:
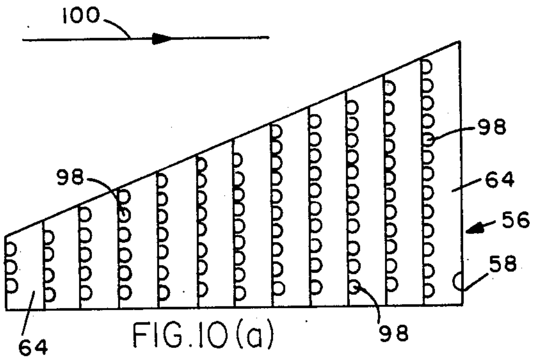
FIGS. 10(*a*), (*b*) and (*c*) correspond to FIGS. 9(*a*), (*b*) and (*c*) and show the manner in which the opening to the restrictor plates of the present invention in its preferred embodiment is tapered to effect a linear increase in force with displacement tending to close the valve as additional plates are exposed which is characteristic of the pilot valve of the present invention.
Figure 10B:
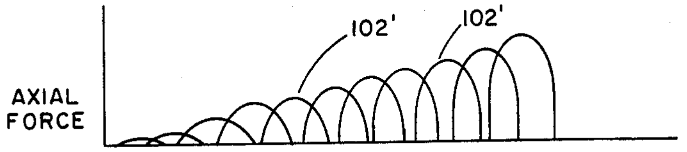
Figure 10C:
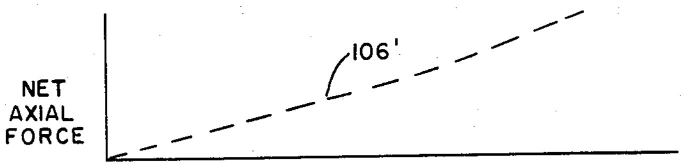

Turning to FIG. 9(*a*), a top view of an inlet opening 58 of rectangular cross-section containing a restrictor 56 comprised of equal width plates 64 having the same number of inlet openings 98 thereto is shown. This configuration was tested with the results depicted graphically therebeneath in views b and c. As the metal plate 70 was rolled off of the inlet opening 58 in the direction of arrow 100, the corresponding pressure surges 102 graphed in corresponding positions in the view of FIG. 9(*b*) were produced; that is, as the openings 98 of each plate 64 were exposed, a pressure surge increase to a maximum point 104 was effected. As the flow through each plate 64 stabilized, however, the pressure drop diminshed or rolled off as indicated by the parabolic pressure surges 102 graphed in FIG. 9(*b*). The result was an effective single level pressure drop as indicated by the dotted line 106 of FIG. 9(*c*); that is, once the initial plate 64 was exposed, further movement of the actuator member 86 to expose additional plates 64 was virtually ineffective. For this reason, the configuration of FIG. 10(*a*) is preferred. In this case, the conduit 54 and inlet opening 58 are trapezoidal in cross-section such that the plates 64 moving in the opening direction of arrow 100 are increasingly longer and, additionally, include an additional number of openings 98. As a consequence, as each plate 64 is exposed, an increased pressure surge 102' as graphed in FIG. 10(*b*) is produced such that the effective pressure drop is a linearly increasing one as graphed in FIG. 10(*c*).

Figure 20:
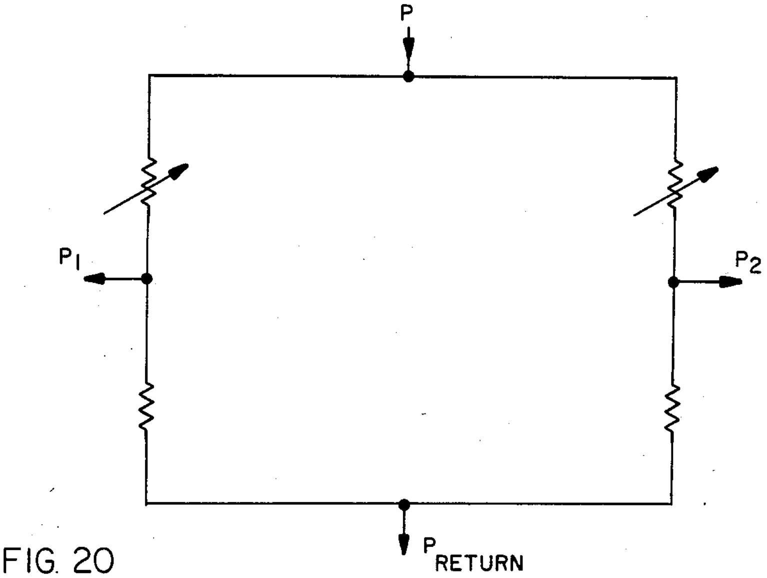
FIG. 20 is a drawing showing the electrical equivalent of the valve of the present invention.

The pilot valve of the present invention is symbolically described in analogous electrical components in FIG. 20. Essentially, the hydraulic fluid at pressure P comes in and passes through the two restrictors which act as resistance paths and passes out through the common return path to the sump to be repumped through the loop. The two taps in the midst of the two resistance paths provide for the two fluids at pressures P1 and P2, respectively.

Turning now to FIGS. 12–16, the pilot valve of the present invention hereinbefore described in simplified form is shown incorporated in a housing as contemplated for commercial development and exploitation. As can be seen, many of the elements are substantially identical to those of the simplified form. The principal change between the simplified form hereinbefore described and the anticipated commercial form is in the structure of the housing and the method of connecting the various fluid flow connections. The housing 48' comprises an outer cylindrical member 108 having a peripheral flange 110 with bores 112 therethrough whereby the valve 46' can be mounted with bolts or studs through the bores 112 directly onto an actuator valve. A central core 114 is positioned within the outer cylindrical member 108 and contains channels to effect the desired fluid flow paths. Connector 116 provides the equivalent of inlet openings 52 through channel 118 into the chamber 50. Connectors 120 and 122 provide the pressure taps for P1 and P2, respectively. The fluid 22 emerging from the fluid restrictors 56 passes into area 124 which is connected to a sump return line. As can be seen in the top view of FIG. 12 and again in FIG. 15, the actuator member 86 comprises a central annular area 126 containing the coils 92 from which lateral portions 128 extend having the connecting strips 88 extending therefrom.

Figure 14:
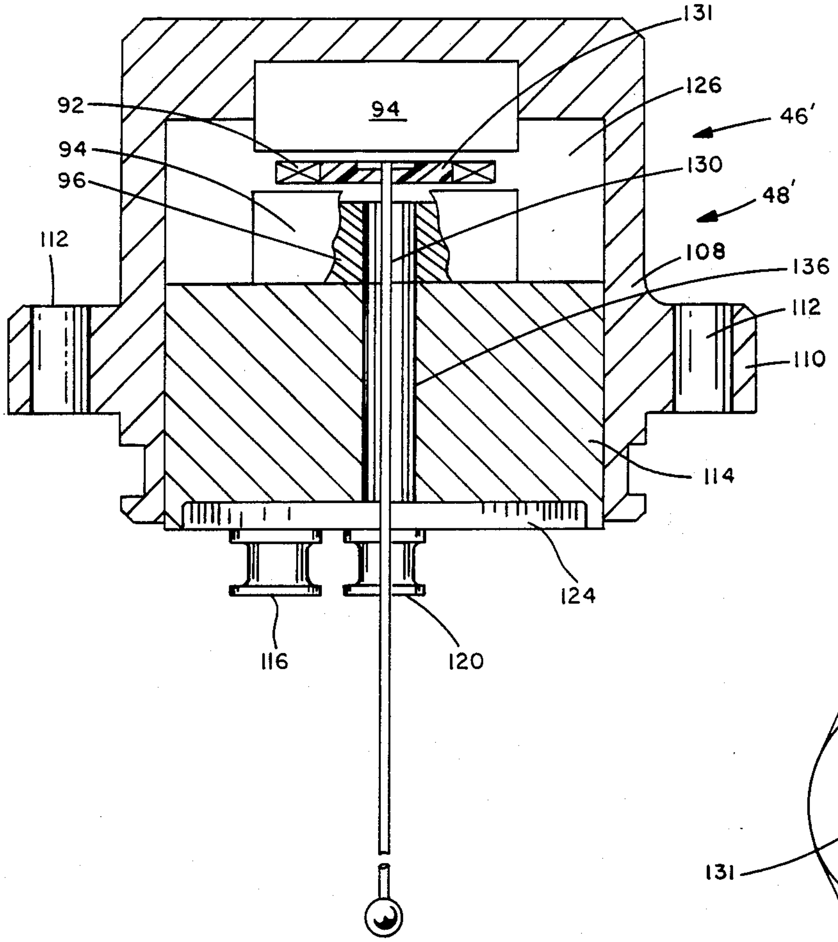
FIG. 14 is a cutaway side elevation through the valve of FIGS. 12 and 13 showing the addition of a mechanical feedback wand thereto.
Figure 15:
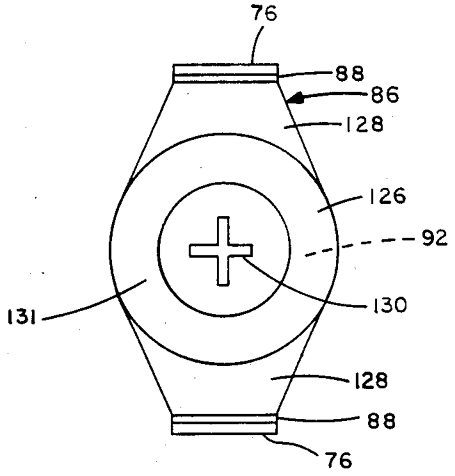
FIG. 15 is a simplified plan view of the actuator coil assembly and mechanical feedback wand of the apparatus of FIG. 14.
Figure 16:
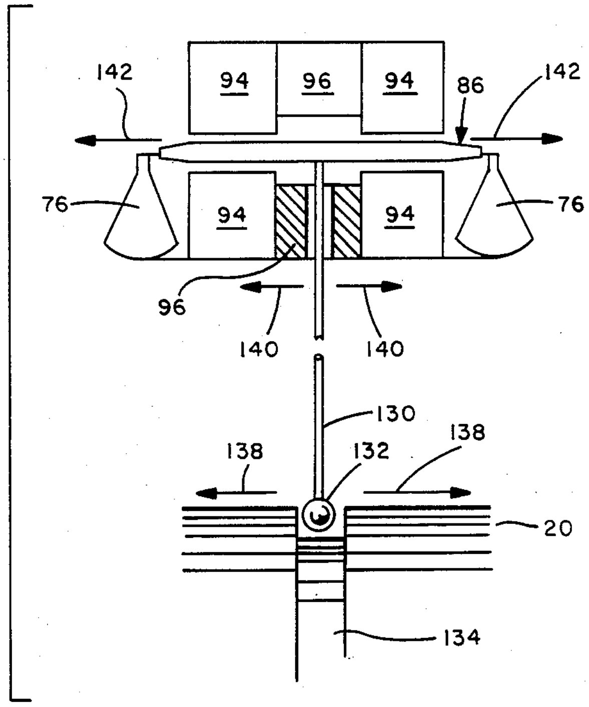
FIG. 16 is a simplified drawing showing the manner of mechanical feedback provided by the apparatus of FIGS. 14 and 15.

In the above-described embodiment, feedback can be provided to the pilot valve 46' in the manner shown in FIGS. 14–16 wherein a resilient flat spring or wand 130 is connected between a filler disc 131 disposed in the central annular area 126 and a contact ball 132 adapted to fit within a groove 134 provided therefor on the piston 20 of the actuator valve 19 to which the pilot valve 46' is connected. The flat spring wand 130 is configured and disposed to provide low stiffness as required in the direction of translation and high stiffness in the direction perpendicular to translation, which is desirable and preferred. The wand 130 passes through a bore 136 provided therefor within the core 114 and lower magnet 96. As can be seen in FIG. 16, as the piston 14 moves in the direction of arrows 138, the wand 130 is urged correspondingly in like direction, as indicated by the arrows 140, which causes a translational feedback force on the actuator member 86, as indicated by the arrows 142, which is equal and opposite to the translational input force of the actuator member. If desired, of course, feedback could also be provided electrically by sensing the position of the spool piston 20 in manners well known to those skilled in the art.

Figure 17:
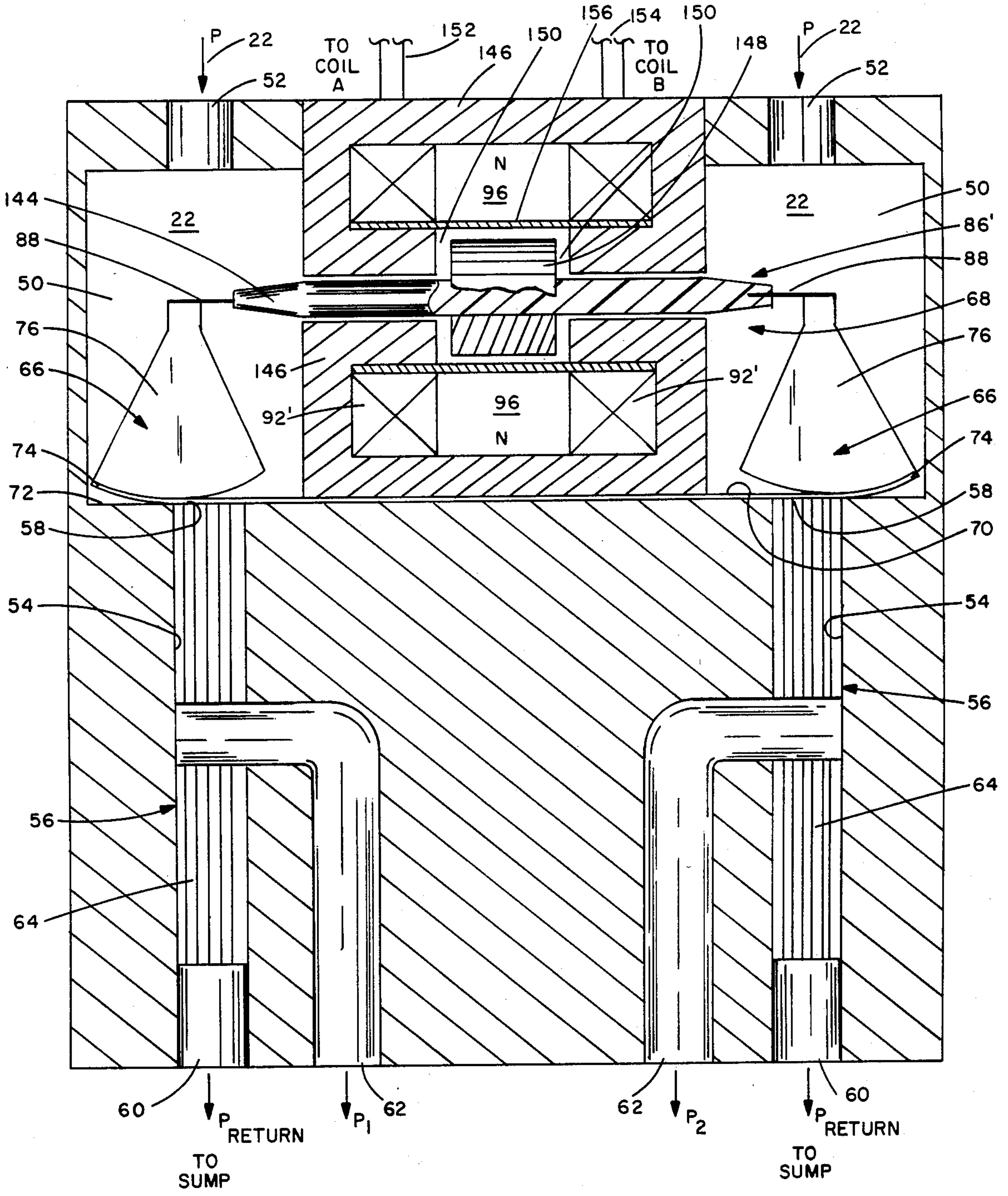
FIG. 17 is a simplified cutaway elevation of a pilot valve of the present invention according to an alternate electrical motor actuator drive embodiment thereof.

Turning now to FIG. 17, a first alternate embodiment of the valve of the present invention is shown therein and generally indicated as 46''. It should be noticed that in all embodiments of the present invention described herein the actuator member 86 and rolling actuators 76 connected to operate the valves 66 in the form of the metal strip 70 disposed over the inlet openings 52 are disposed totally within the chamber 50. This construction is key to the successful operation of the valve of the present invention inasmuch as the available operative forces are insufficient to overcome the friction that would be involved in passing a sliding actuator connection through seals in the sidewalls of the housing 48 in the presence of the type of pressures involved in the application for which the pilot valve of the present invention is designed. A completely "dry" embodiment will be described shortly.

Figure 18:
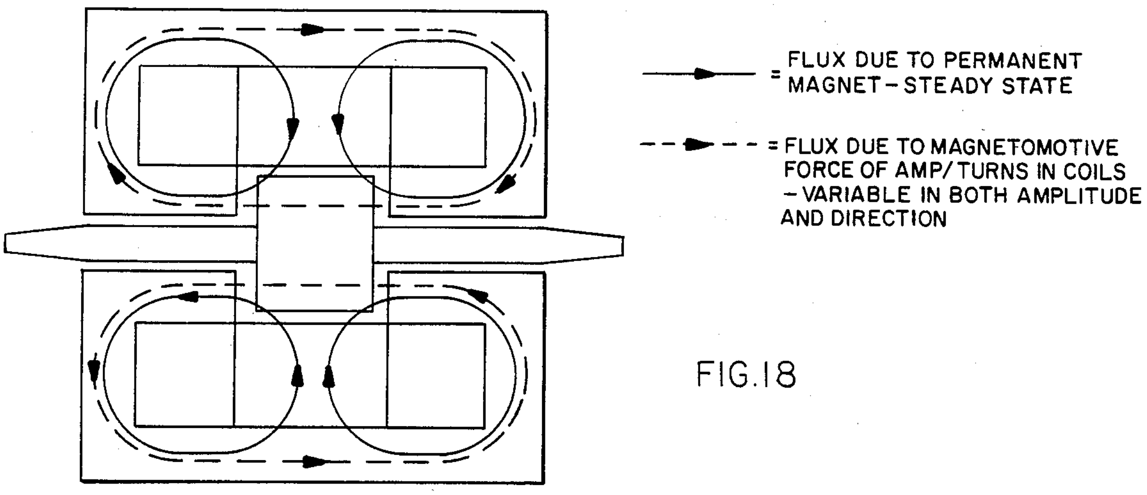
FIG. 18 is a drawing showing the paths of magnetic flux in the embodiment of FIG. 17.

In the previously described embodiment, a large number of turns of fine wire comprise the upper and lower horizontally disposed coils 92 and the gap between the pole pieces 48 and the strength of the samarium cobalt magnets 96 is such as to produce the resultant force. In the embodiment of FIG. 17, a solenoid-type construction is employed to create the lateral forces on the actuator member 86'. The actuator member 86' comprises a shaft 144 disposed for slideable movement between two C-shaped upper and lower pole pieces 146. An armature 148 is mounted on the shaft 144 in the air gap 150 of the pole pieces 146. A pair of coils 92' are vertically disposed within the ends of the pole pieces 146 in combination forming a left or "A" coil and a right or "B" coil as FIG. 17 is viewed. Control signals are sent to the A and B coils 92' through input wires 152 and 154 respectively. Samarium cobalt magnets 96 are disposed within the pole pieces 146 and between the coils 92' as shown in FIG. 17. In the neutral position with no signal to the coils 92', the permanent magnetic flux through the armature 148 at both ends of the air gap 150 from the magnets 92' is longitudinally equal and opposite. The coils 92' are wound and the d.c. control signal applied through wires 152 and 154 so as to cause the electromagnetic flux from the coils 92' to subtract from the permanent magnetic flux from the magnets 96 in one end of the air gap 150 and to be additive in the other end. This provides a net force on the armature 148 (and thus the actuator member 86') which is directional depending on the direction of coil current and linear with coil current magnitude. The two sources of magnetic flux and their paths are shown in FIG. 18. With the above-described exceptions, the construction of the embodiment shown in simplified form in FIG. 17 is substantially identical to that of the embodiment shown in simplified form in FIG. 4.

Figure 19A:
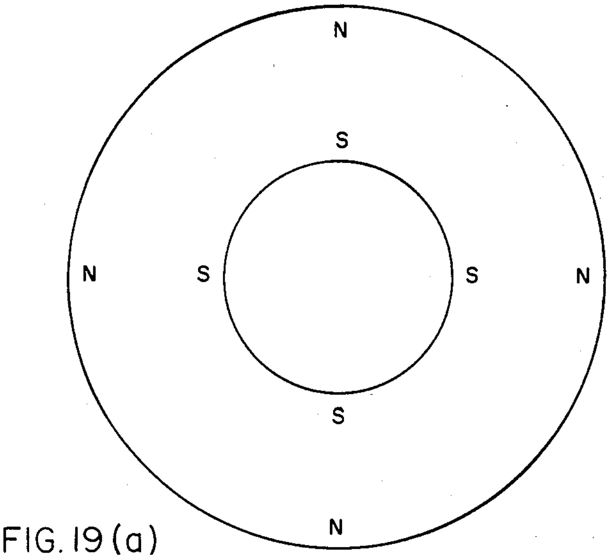
FIG. 19(*a*) and (*b*) are drawings of an alternate magnet configuration using a single magnet to replace the magnetic pair in the embodiment of FIG. 17.
Figure 19B:
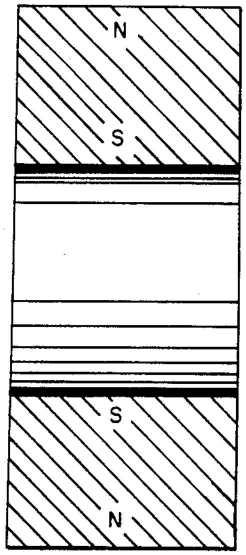

A possible variation is shown in FIGS. 19(*a*) and (*b*). Instead of two single magnets providing the permanent magnetic flux, a single cylindrical permanent magnet magnetized radially can be substituted to produce the same flux pattern.

In the embodiments of both FIG. 17 and FIGS. 19(*a*) and (*b*), the coils can be sealed and isolated from contact with the fluid under pressure in chamber 50 by use of a single non-magnetic metal tube or sleeve 156 integral with and mounted to the two C-shaped upper and lower pole pieces 146. Beryllium copper is a preferred material for the purpose.

Turning now to FIGS. 21–25, another embodiment of the present invention is shown. In this embodiment, generally indicated as 200, a torque motor drive, generally indicated as 202, is employed wherein all the electrical components are completely sealed from the chamber 50 so as to be completely separated from the hydraulic fluid 22 contained therein. Moreover, by employing a unique torque drive, the use of a seal with potential leakage and friction between the torque motor drive 202 and the chamber 50 is eliminated.

The lower portion of pilot valve 200 is substantially identical to the two previously described embodiments; that is, a chamber 50 is provided having a flat bottom surface 72 with inlet openings 58 therein leading to a pair of conduits 54 each containing a fluid restrictor 56 and having an outlet opening 60 on the other end and a tap outlet opening 62 between the two from which pressures P1 and P2, respectively, are obtained. As previously, the fluid restrictors 56 comprise a plurality of restrictor plates of 64. Also, as previously, the inlet openings 58 are provided with respective valves 66' each having a moving actuator 76' connected to the outermost ends of metal strips 70' to be rolled off of and onto the inlet openings 58 in much the same manner as previously described with the foregoing embodiments.

While that much of the pilot valve 200 is substantially the same as in the previous embodiments, the shape of the rolling actuators 76', the metal strips 70', and the method of actuation thereof are substantially different.

Figure 22:
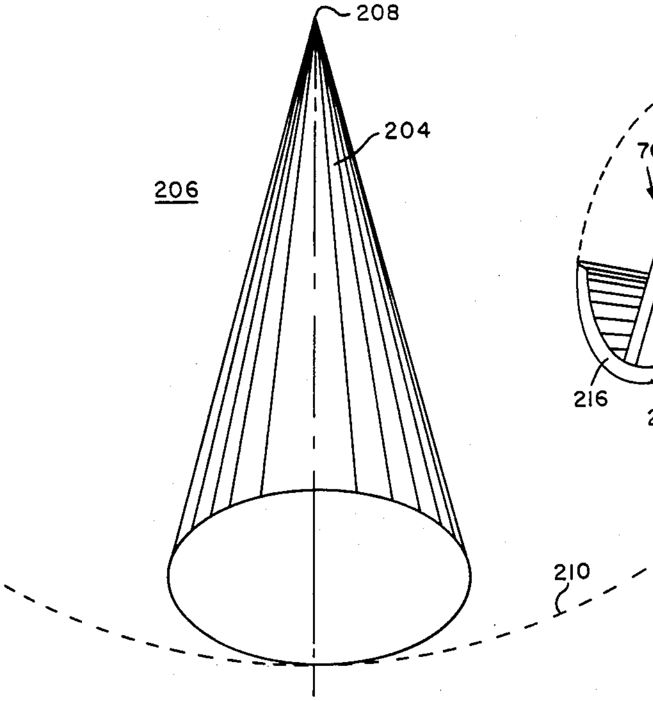
FIG. 22 is a drawing showing how a cone lying on a flat surface rolls.
Figure 23:
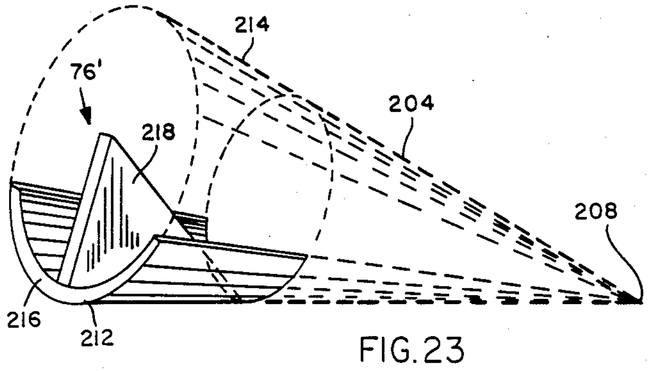
FIG. 23 is a perspective view showing how the rolling actuators of this embodiment are frusto-conical arcuate segments.
Figure 24:
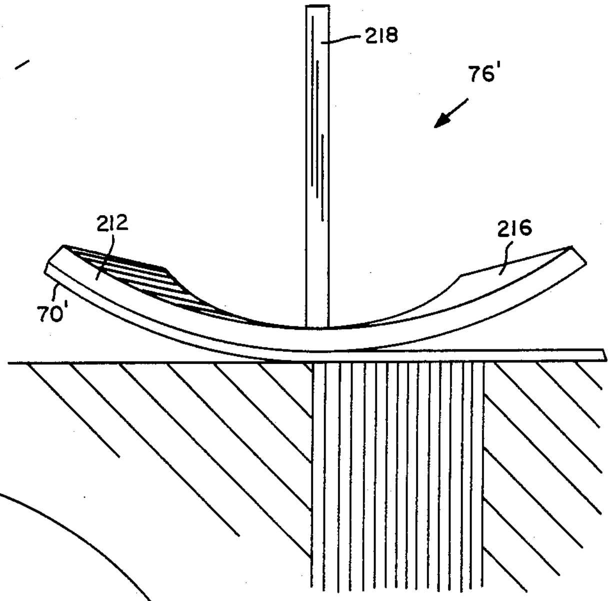
FIG. 24 is an end view of one of the rolling actuators of this embodiment.
Figure 25:
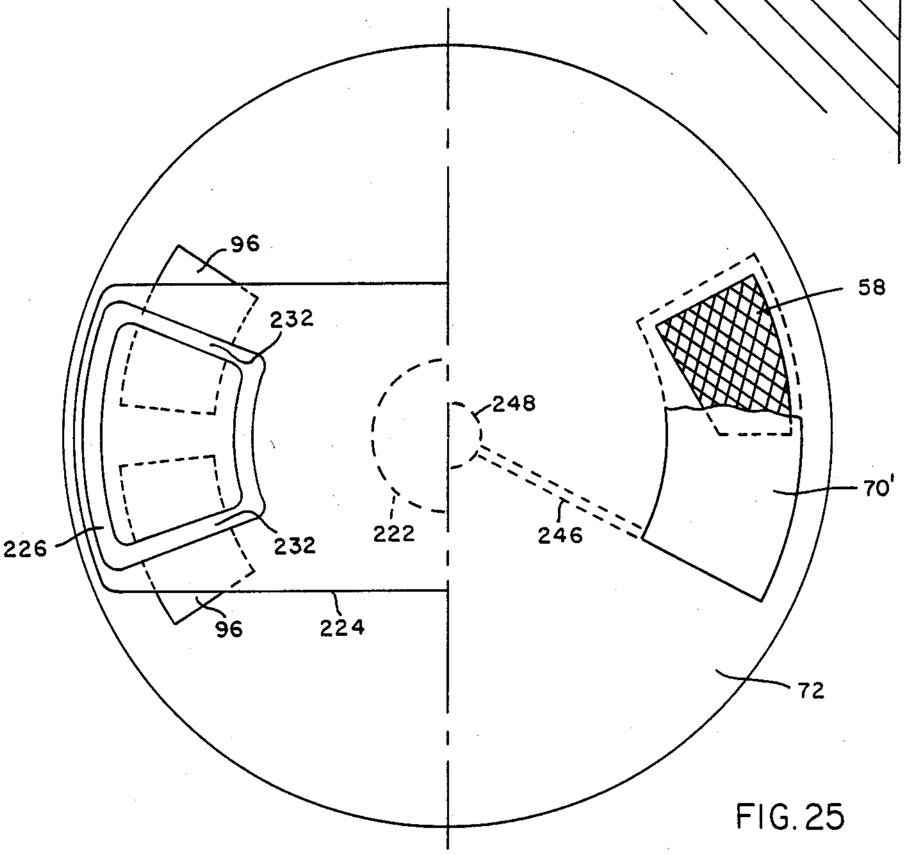
FIG. 25 is a composite partially cutaway plan view showing the planes of the actuator coils and the inlets to the restrictor paths.

Turning now to FIGS. 22–24, the shape of the rolling actuator 76′ and the theory of operation thereof are described. FIG. 22 represents the top view of a cone 204 lying on a flat plane 206 represented by the plane of the drawing figure. As is well known, if cone 204 is subjected to a non-sliding force parallel to the plane 206, it will roll about its apex 208 in a circle as represented by the dotted line 210. Whereas, it will be remembered that the rolling actuators 76 of the previous embodiments were cut as wedges or arcuate segments from a cylinder, the actuator 76′ of the present invention is cut as an arcuate section 212 of a frusto-conical portion 214 of the cone 204. As such, when rotated or rolled, the actuator 76′ will tend to roll in a circular path about the apex 208 of the cone 204 from which it was derived. As shown in FIG. 24 in end view, the actuator 76′ comprises a rolling portion 216 which is in the shape of the arcuate section 212 of the frusto-conical section 214 of cone 24, having an actuating lever portion 218 extending vertically therefrom to which rotational pressure is applied in a manner to be discussed in greater detail shortly. As best appreciated from the view of the right hand portion of FIG. 25 which represents a view at the upper surface 72 of chamber 50, the metal strips 70′ are in the form of a circular segment and the rolling actuators 76′ are positioned with their virtual apex in the center of the plate 72 so as to roll the strips 70′ onto and off of the inlet openings 58 along a circular path instead of a straight line as in the previously described embodiments.

Figure 21:
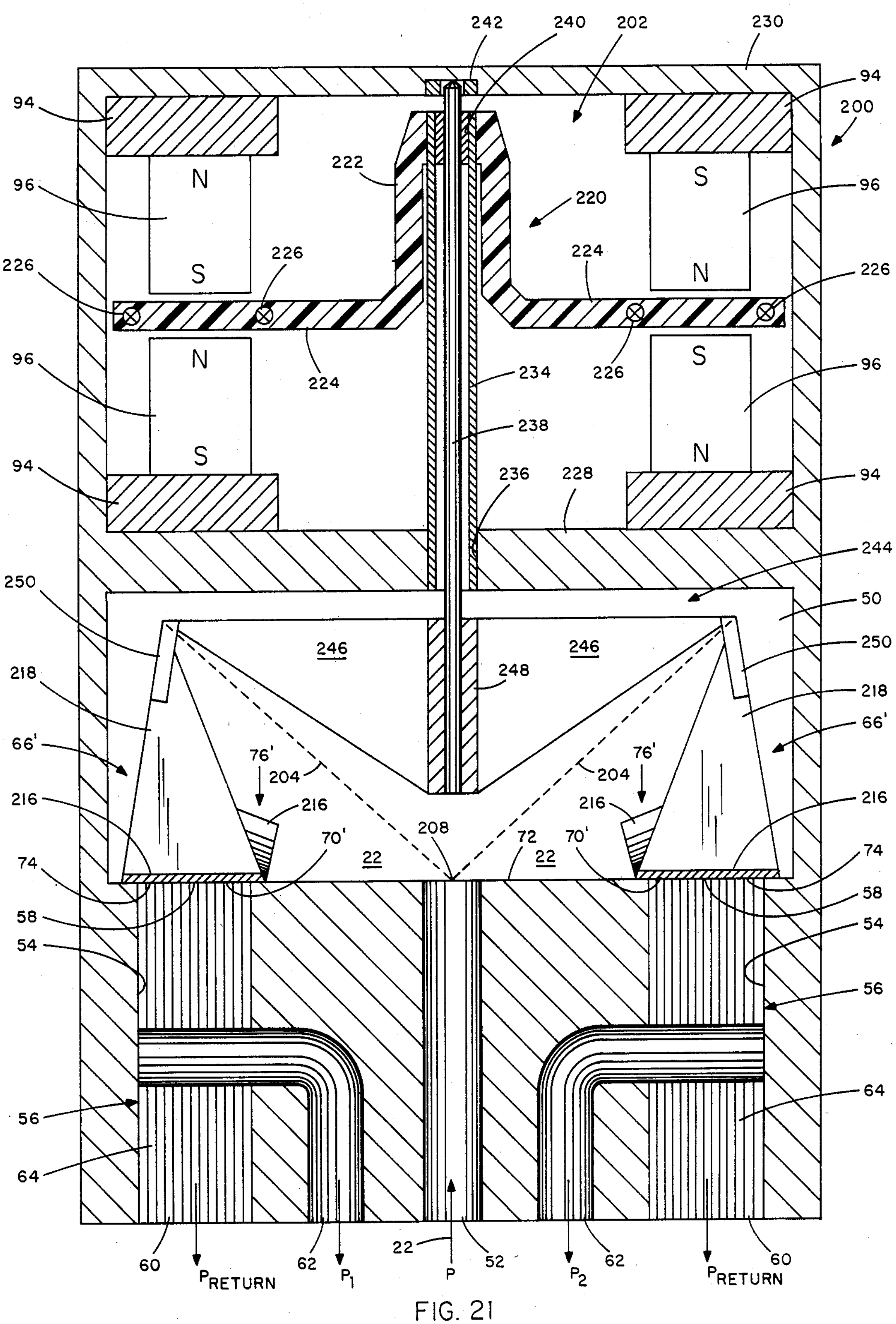
FIG. 21 is a cutaway simplified drawing of yet another embodiment of the present invention employing a torque motor drive in which all the electrical components are sealed from the hydraulic fluid.

Turning now to FIG. 21 with particularity, the torque motor drive 202 comprises an armature assembly 220 mounted for rotation in a plane parallel to surface 72. Armature assembly 220 comprises a center spindle portion 222 having opposed arms 224 extending radially outward therefrom. The spindle portion 222 and arms 224 are formed of plastic and each of the outer ends of the arms 224 has a skein of magnetic wire embedded therein at 226 having wires (not shown) adapted to be connected to the electric controlling signal as with the coils 92 in the previous embodiment. The wire skeins 226 are disposed between opposed magnets 96 which, in turn, are disposed between pole pieces 94. This can also be seen in the left hand portion of FIG. 25 which represents the view in the plane of the arm 224. As can be seen, there are actually two pairs of opposed magnets 96 on each side of the arm 224 and the skeins of wire 226 are disposed such that only portions 232 which pass between the magnets along radial lines from the center spindle 222 are disposed between the magnets 96. Thus, as current from a signal is made to flow through the wire skeins 226, the current through portions 232 will create a magnetic flux tending to co-act with the magnetic flux between the magnets 96 so as to create a clockwise or counterclockwise rotational torque on the arms 224, depending on the current direction.

A bulkhead 228 separates the chamber 50 from the upper portion of the housing 230 containing the torque motor 202. A torsion tube 234 is mounted through a bore 236 so as to be normal to the bulkhead 228 and the surface 72 concentric with the center line of both. The torsion tube 234 is sealed to the walls of bore 236 to prevent leakage of the hydraulic fluid 222 therebetween. Torsion tube 234 acts as a spring restraint and is made of thin-walled beryllium copper tubing. A torsion transfer rod 238 of tungsten carbide is centrally disposed within the torsion tube 234 being carried at the top end of torsion tube 234 by a metal collar 240 which is sealed to both the rod 238 and tube 234, thus effectively completely closing the bore 236 to the passage of hydraulic fluid 22 from chamber 50 into the space occupied by the torque motor 202. Note, that a small portion of the rod 238 extends above the collar 240 into a shock support bushing 242 disposed in the top end of the housing 230. A close tolerance fit exists between the end of the rod 234 and the bushing 242 so that the rod 238 can rotate within bushing 242 while, at the same time, preventing motion of the armature assembly 220 from physical shock to the pilot valve 200. The center spindle portion 222 of armature assembly 220 is concentrically disposed about the top end of the torsion tube 234. Spindle portion 222 is a tight force fit aboiut the tube 234 so that no sliding therebetween can occur. As a consequence, as the above-described rotational forces are created on the arms 224 by the magnetic forces acting on the wire skeins 226, this rotational force is transferred to the center spindle 222 which, in turn, transfers it to the torsion tube 234 and torsion transfer rod 238 contained therein. The lower end of the rod 238 passes beneath the bulkhead 228 where a low inertia torsion transfer bracket 224 having sheet metal arms 246 extending radially outward from a hub 248 is attached. The outer tips of the arms 246 are attached to the top end of the actuating lever portions of the rolling actuators 76′ by flexible joints 250. Thus, as the armature assembly 220 is rotated, the torsion tube acts as a spring in a twisting action while, simultaneously, the stiff torsion transfer rod transmits the torsional force into the hub 248, from thence to the arms 246, through the flexible joints 250 and into a rotational force on the actuators 76′ tending to open one valve 66 and close the other as with the previous embodiments. As the signal is removed, the restorative force of the torsion tube 234 moves the arms 224 back to their neutral position.

Thus, it can be seen that in all of the embodiments as described herein, the stated objectives have been met in that low noise components are operated in a low noise environment and wherein, additionally, fluid flow only takes place during actual movement of the piston of the actuator valve with substantially no fluid flow taking place when the pilot valve of the present invention is in a neutral position.

Wherefore, having thus described my invention, I claim:

1. A pilot valve for receiving fluid from a source at a pressure P at an inlet thereof and for delivering fluid at changeable reduced pressures P1 and P2 at respective ones of a pair of outlets in response to an electrical control signal thereto, said valve comprising:

(a) a housing including a chamber having the inlet communicating therewith and a pair of outlets therefrom;

(b) first fluid restrictor means having an inlet connected to one of said housing outlets, an outlet, and a tap therebetween for delivering a portion of fluid passing therethrough between said inlet and outlet thereof at the reduced pressure P1 at said tap thereof;

(c) second fluid restrictor means having an inlet connected to the other of said housing outlets, an outlet, and a tap therebetween for delivering a portion of fluid passing therethrough between said inlet and outlet thereof at the reduced pressure P2 at said tap thereof;

(d) first valve means disposed over said inlet of said first fluid restrictor means for controlling the amount of fluid entering said first fluid restrictor means from said chamber;

(e) second valve means disposed over said inlet of said second fluid restrictor means for controlling the amount of fluid entering said second fluid restrictor means from said chamber; and (f) activator means operably connected to said first and second valve means and having an input adapted to receive the electrical control signal for moving said first and second valve means in combination in response to the electrical control signal, said activator means being connected such that as one of said valve means is moved in a direction tending to increase the flow of fluid therethrough, the other of said valve means is moved in a direction tending to decrease the flow of fluid therethrough;

wherein said first and second valve means each includes one of a pair of arcuate flexible strips adapted to be progressively rolled along a circular path over and off of said inlet thereof; and, said first and second valve means each includes one of a pair of frusto-conical wedge segment members having respective ones of said strips attached along one edge and disposed to be rolled along said path by said members.

2. The pilot valve of claim 1 wherein said activator means comprises:

(a) an actuator member mounted for rotational movement and disposed between said wedge segment members and flexibly connected thereto whereby as said actuator member is rotated said segment members are rolled over said inlets of said first and second valve means in combination;

(b) a coil operably connected to said actuator member to move in combination therewith and adapted to be connected to receive the electrical control signal; and , (c) a pair of permanent magnets disposed in opposed spaced relationship to form an air gap with said coil disposed therein within a field of magnetic flux within said gap whereby a d.c. control signal flowing through said coil causes a rotational force on said coil and actuator member in a direction dependent on the direction of current flow to roll said segment members and thereby change the status of said first and second valve means as a function of said control signal.

3. The pilot valve of claim 2 wherein:

(a) said actuator member is disposed within said chamber; and (b) said coil is disposed outside of said chamber and is connected to said actuator member by torque transfer means for sealing said coil from hydraulic fluid in said chamber.

4. The pilot valve of claim 3 wherein:

said coil comprises two skeins of wire disposed in the ends of opposed arms mounted for rotational movement on a torsion tube and connected to said actuator means by a torsion transfer rod disposed within said tube.

5. A pilot valve for receiving fluid from a source at a pressure P at an inlet thereof and for delivering fluid at changeable reduced pressures P1 and P2 at respective ones of a pair of outlets in response to an electrical control signal thereto, said valve comprising:

(a) a housing including a chamber having the inlet communicating therewith and a pair of outlets therefrom;

(b) first fluid restrictor means having an inlet connected to one of said housing inlets, an outlet, and a tap therebetween for delivering a portion of fluid passing therethrough between said inlet and outlet thereof at the reduced pressure P1 at said tap thereof;

(c) second fluid restrictor means having an inlet connected to the other of said housing outlets, an outlet, and a tap therebetween for delivering a portion of fluid passing therethrough between said inlet and outlet thereof at the reduced pressure P2 at said tap thereof;

(d) first valve means disposed over said inlet of said first fluid restrictor means for controlling the amount of fluid entering said first fluid restrictor means from said chamber;

(e) second valve means disposed over said inlet of said second fluid restrictor means for controlling the amount of fluid entering said second fluid restrictor means from said chamber and, (f) activator means operably connected to said first and second valve means and having an input adapted to receive the electrical control signal for moving said first and second valve means in combination in response to the electrical control signal, said activator means being connected such that as one of said valve means is moved in a direction tending to increase the flow of fluid therethrough, the other of said valve means is moved in a direction tending to decrease the flow of fluid therethrough;

wherein said first and second valve means each include a flexible strip adapted to be progressively rolled over and off of said inlet thereof;

wherein said first and second valve means each includes one of a pair of cylindrical wedge segment members having said strip attached along one edge and disposed to be rolled across said associated inlet thereof whereby said flexible strip is rolled over and off of said inlet by said member;

and wherein said activator means comprises:

an actuator member disposed between said cylindrical wedge segment members and flexibly connected thereto whereby as said actuator member is moved longitudinally said segment members are rolled over said inlets of said first and second valve means in combination;

a coil carried by said actuator member to move in combination therewith and adapted to be connected to receive the electrical control signal;

a pair of pole pieces disposed in opposed spaced relationship to form an air gap with said coil disposed therebetween; and, a pair of permanent magnets disposed in relationship to respective ones of said pole pieces so as to cause magnetic flux to flow across said air gap and through said coil between said pole pieces whereby a d.c. control signal flowing through said coil causes an unbalanced force on said coil which moves said actuator member longitudinally in a direction dependent on the direction of current flow to roll said segment members and thereby change the status of said first and second valve means as a function of said control signal.

6. A pilot valve for receiving fluid from a source at a pressure P at an inlet thereof and for delivering fluid at changeable reduced pressures P1 and P2 at respective ones of a pair of outlets in response to an electrical control signal thereto, said valve comprising:

(a) a housing including a chamber having the inlet communicating therewith and a pair of outlets therefrom;

(b) first fluid restrictor means having an inlet connected to one of said housing inlets, an outlet, and a tap therebetween for delivering a portion of fluid passing therethrough between said inlet and outlet thereof at the reduced pressure P1 at said tap thereof;

(c) second fluid restrictor means having an inlet connected to the other of said housing outlets, an outlet, and a tap therebetween for delivering a portion of fluid passing therethrough between said inlet and outlet thereof at the reduced pressure P2 at said tap thereof;

(d) first valve means disposed over said inlet of said first fluid restrictor means for controlling the amount of fluid entering said first fluid restrictor means from said chamber;

(e) second valve means disposed over said inlet of said second fluid restrictor means for controlling the amount of fluid entering said second fluid restrictor means from said chamber; and (f) activator means operably connected to said first and second valve means and having an input adapted to receive the electrical control signal for moving said first and second valve means in combination in response to the electrical control signal, said activator means being connected such that as one of said valve means is moved in a direction tending to increase the flow of fluid therethrough, the other of said valve means is moved in a direction tending to decrease the flow of fluid therethrough;

wherein said first and second valve means each include a flexible strip adapted to be progressively rolled over and off of said inlet thereof;

wherein said first and second valve means each includes one of a pair of cylindrical wedge segment members having said strip attached along one edge and disposed to be rolled across said associated inlet thereof whereby said flexible strip is rolled over and off of said inlet of said member;

and wherein said activator means comprises:

an actuator member disposed between said cylindrical wedge segment members and flexibly connected thereto whereby as said actuator member is moved longitudinally said segment members are rolled over said inlets of said first and second valve means in combination;

an armature member carried by said actuator member to move in combination therewith;

a pair of C-shaped pole pieces disposed in opposed, facing, spaced relationship to form an air gap with said actuator member and said armature member disposed therebetween and with said armature member disposed within the C-shaped opening of said pole pieces;

a first coil adapted to be connected to receive the electrical control signal disposed within one opposed end of the C-shape of said pole pieces;

a second coil adapted to be connected to receive the electrical control signal disposed within the other opposed end of the C-shape of said pole pieces; and permanent magnet means for producing longitudinally equal and opposite magnetic fluxs in said armature member disposed in respective ones of said pole pieces between said first and second coils, said magnet means being positioned to create equal and opposite magnetic fluxs through said armature when no current is flowing through said coils, said coils being wound such that a d.c. control signal flowing through said coils causes a proportional unbalanced change in said fluxs which moves said armature member and said actuator member longitudinally in a direction dependent on the direction of current flow to roll said segment members and thereby change the status of said first and second valve means as a function 7. The pilot valve of claim 6 and additionally comprising:

a sleeve of a non-magnetic metal disposed integral with and mounted to said C-shaped pole pieces to seal and isolate said first and second coils from contact with fluid within said chamber.

8. In a pilot valve for receiving fluid from a source at a pressure P at an inlet thereof and for delivering fluid at changeable reduced pressures P1 and P2 at respective ones of a pair of outlets in response to an electrical control signal thereto, the valve including a housing with a chamber having the inlet communicating therewith and a pair of outlets therefrom, first fluid restrictor means having an inlet connected to one of the housing outlets, an outlet, and a tap therebetween for delivering a portion of fluid passing therethrough between the inlet and outlet thereof at the reduced pressure P1 at the tap thereof, second fluid restrictor means having an inlet connected to the other of the housing outlets, an outlet, and a tap therebetween for delivering a portion of fluid passing therethrough between the inlet and outlet thereof at the reduced pressure P2 at the tap thereof, first valve means for controlling the amount of fluid entering the first fluid restrictor means from the chamber, and second valve means for controlling the amount of fluid entering the second fluid restrictor means from the chamber, the improvement comprising:

(a) said first valve means being disposed over said inlet of said first fluid restrictor means for controlling the amount of fluid entering said first fluid restrictor means over the range of no fluid flow to full fluid flow;

(b) said second valve means being disposed over said inlet of said second fluid restrictor means for controlling the amount of fluid entering said second fluid restrictor means over the range of no fluid flow to full fluid flow; and (c) activator means operably connected to said first and second valve means and having an input adapted to receive the electrical control signal for moving said first and second valve means in combination in response to the electrical control signal, said activator means being connected such that as one of said valve means is moved in a direction tending to increase the flow of fluid therethrough, the other of said valve means is moved in a direction tending to decrease the flow of fluid therethrough;

wherein said first and second valve means each includes one of a pair of arcuate flexible strips adapted to be progressively rolled along a circular path over and off of said inlet thereof; and, said first and second valve means each includes one of a pair of frusto-conical wedge segment members having respective ones of said strips attached along one edge and disposed to be rolled along said path by said members.

9. The pilot valve of claim 8 wherein said activator means comprises:

(a) an actuator member mounted for rotational movement and disposed between said wedge segment members and flexibly connected thereto whereby as said actuator member is rotated said segment members are rolled over said inlets of said first and second valve means in combination;

(b) a coil operably connected to said actuator member to move in combination therewith and adapted to be connected to receive the electrical control signal; and, (c) a pair of permanent magnets disposed in opposed spaced relationship to form an air gap with said coil disposed therein within a field of magnetic flux within said gap whereby a d.c. control signal flowing through said coil causes a rotational force on said coil and actuator member in a direction dependent on the direction of current flow to roll said segment members and thereby change the status of said first and second valve means as a function of said control signal.

10. The pilot valve of claim 9 wherein:

(a) said actuator member is disposed within said chamber; and, (b) said coil is disposed outside of said chamber and is connected to said actuator member by means for sealing said coil from hydraulic fluid in said chamber.

11. The pilot valve of claim 10 wherein:

said coil comprises two skeins of wire disposed in the ends of opposed arms mounted for rotational movement on a torsion tube and connected to said actuator means by a torsion transfer rod disposed within said tube.

12. In a pilot valve for receiving fluid from a source at a pressure P at an inlet thereof and for delivering fluid at changeable reduced pressures P1 and P2 at respective ones of a pair of outlets in response to an electrical control signal thereto, the valve including a housing with a chamber having the inlet communicating therewith and a pair of outlets therefrom, first fluid restrictor means having an inlet connected to one of the housing outlets, an outlet, and a tap therebetween for delivering a portion of fluid passing therethrough between the inlet and outlet thereof at the reduced pressure P1 at the top thereof, second fluid restrictor means having an inlet connected to the other of the housing outlets, an outlet, and a tap therebetween for delivering a portion of fluid passing therethrough between the inlet and outlet thereof at the reduced pressure P2 at the tap thereof, first valve means for controlling the amount of fluid entering the first fluid restrictor means from the chamber, and second valve means for controlling the amount of fluid entering the second fluid restrictor means from the chamber, the improvement comprising:

(a) said first valve means being disposed over said inlet of said first fluid restrictor means for controlling the amount of fluid entering said first fluid restrictor means over the range of no fluid flow to full fluid flow;

(b) said second valve means being disposed over said inlet of said second fluid restrictor means for controlling the amount of fluid entering said second fluid restrictor means over the range of no fluid flow to full fluid flow; and (c) activator means operably connected to said first and second valve means and having an input adapted to receive the electrical control signal for moving said first and second valve means in combination in response to the electrical control signal, said activator means being connected such that as one of said valve means is moved in a direction tending to increase the flow of fluid therethrough, the other of said valve means is moved in a direction tending to decrease the flow of fluid therethrough;

wherein said first and second valve means each include a flexible strip adapted to be progressively rolled over and off of said inlet thereof;

wherein said first and second valve means each includes one of a pair of cylindrical wedge segment members having said strip attached along one edge and disposed to be rolled across said associated inlet thereof whereby said flexible strip is rolled over and off of said inlet by said member;

and wherein said activator means comprises:

an actuator member disposed between said cylindrical wedge segment members and flexibly connected thereto whereby as said actuator member is moved longitudinally said segment members are rolled over said inlet of said first and second valve means in combination;

a coil carried by said actuator member to move in combination therewith and adapted to be connected to receive the electrical control signal;

a pair of pole pieces disposed in opposed spaced relationship to form an air gap with said coil disposed therebetween; and, a pair of permanent magnets disposed in relationship to respective ones of said pole pieces so as to cause magnetic flux to flow across said air gap and through said coil between said pole pieces whereby a d.c. control signal flowing through said coil causes an unbalanced force on said coil which moves said actuator member longitudinally in a direction dependent on the direction of current flow to roll said segment members and thereby change the status of said first and second valve means as a function of said control signal.

13. In a pilot valve for receiving fluid from a source at a pressure P at an inlet thereof and for delivering fluid at changeable reduced pressures P1 and P2 at respective ones of a pair of outlets in response to an electrical control signal thereto, the valve including a housing with a chamber having the inlet communicating therewith and a pair of outlets therefrom, first fluid restrictor means having an inlet connected to one of the housing outlets, an outlet, and a tap therebetween for delivering a portion of fluid passing therethrough between the inlet and outlet thereof at the reduced pressure P1 at the tap thereof, second fluid restrictor means having an inlet connected to the other of the housing outlets, an outlet, and a tap therebetween for delivering a portion of fluid passing therethrough between the inlet and outlet thereof at the reduced pressure P2 at the tap thereof, first valve means for controlling the amount of fluid entering the first fluid restrictor means from the chamber, and second valve means for controlling the amount of fluid entering the second fluid restrictor means from the chamber, the improvement comprising:

(a) said first valve means being disposed over said inlet of said first fluid restrictor means for controlling the amount of fluid entering said first fluid restrictor means over the range of no fluid flow to full fluid flow;

(b) said second valve means being disposed over said inlet of said second fluid restrictor means for controlling the amount of fluid entering said second fluid restrictor means over the range of no fluid flow to full fluid flow; and (c) activator means operably connected to said first and second valve means and having an input adapted to receive the electrical control signal for moving said first and second valve means in combination in response to the electrical control signal, said activator means being connected such that as one of said valve means is moved in a direction tending to increase the flow of fluid therethrough, the other of said valve means is moved in a direction tending to decrease the flow of fluid therethrough;

wherein said first and second valve means each include a flexible strip adapted to be progressively rolled over and off of said inlet thereof;

wherein said first and second valve means each includes one of a pair of cylindrical wedge segment members having said strip attached along one edge and disposed to be rolled across said associated inlet thereof whereby said flexible strip is rolled over and off of said inlet by said member;

and wherein said activator means comprises:

an actuator member disposed between said cylindrical wedge segment members and flexibly connected thereto whereby as said actuator member is moved longitudinally said segment members are rolled over said inlets of said first and second valve means in combination;

an armature member carried by said actuator member to move in combination therewith;

a pair of C-shaped pole pieces disposed in opposed, facing, spaced relationship to form an air gap with said actuator member and said armature member disposed therebetween and with said armature member disposed within the C-shaped opening of said pole pieces;

a first coil adapted to be connected to receive the electrical control signal disposed within one opposed end of the C-shape of said pole pieces;

a second coil adapted to be connected to receive the electrical control signal disposed within the other opposed end of the C-shape of said pole pieces; and, permanent magnet means for producing longitudinally equal and opposite magnetic fluxs in said armature member disposed in respective ones of said pole pieces between said first and second coils, said magnet means being positioned to create equal and opposite magnetic fluxs through said armature when no current is flowing through said coils, said coils being wound such that a d.c. control signal flowing through said coils causes a proportional unbalanced change in said fluxs which moves said armature member and said actuator member longitudinally in a direction dependent on the direction of current flow to roll said segment members and thereby change the status of said first and second valve means as a function of said control signal.

14. The pilot valve of claim 13 and additionally comprising:

a sleeve of a non-magnetic metal disposed integral with and mounted to said C-shaped pole pieces to seal and isolate said first and second coils from contact with fluid within said chamber.

15. A pilot valve for receiving fluid from a source at a pressure P at an inlet thereof and for delivering fluid at changeable reduced pressures P1 and P2 at respective ones of a pair of outlets in response to an electrical control signal thereto, said valve comprising:

(a) first fluid restrictor means for receiving the source fluid at an inlet thereof, for passing the source fluid therethrough, and for delivering a portion of the source fluid passing therethrough at an outlet thereof at the reduced pressure P1;

(b) second fluid restrictor means for receiving the source fluid at an inlet thereof, for passing the source fluid therethrough, and for delivering a portion of the source fluid passing therethrough at an outlet thereof at the reduced pressure P2; and (c) valve means having an input adapted to receive the electrical control signal for controlling the amount of source fluid entering said inlets of said first and second fluid restrictor means and thereby said pressures P1 and P2, said valve means including first and second valves disposed over respective ones of said inlets of said restrictor means, said valve means being adapted for moving said first and second valves in combination in response to the electrical control signal such that as one of said valves is moved in a direction tending to increase the flow of fluid therethrough, the other of said valves is moved in a direction tending to decrease the flow of fluid therethrough;

wherein said first and second valves each include a flexible strip adapted to be progressively rolled over and off of respective ones of said inlets of said first and second fluid restrictor means;

wherein said first and second valves each includes one of a pair of cylindrical wedge segment members having said strp attached along one edge and disposed to be rolled across said associated inlet whereby said flexible strip is rolled over and off of said inlet by said member;

and wherein said valve means includes activator means comprising:

an actuator member disposed between said cylindrical wedge segment members and flexibly connected thereto whereby as said actuator member is moved longitudinally said segment members are rolled over said inlets of said first and second fluid restrictor means in combination;

a coil carried by said actuator member to move in combination therewith and adapted to be connected to receive the electrical control signal;

a pair of pole pieces disposed in opposed spaced relationship to form an air gap with said coil disposed therebetween; and, a pair of permanent magnets disposed in relationship to respective ones of said pole pieces so as to cause magnetic flux to flow across said air gap and through said coil between said pole pieces whereby a variable d.c. control signal flowing through said coil causes a proportional unbalanced force on said coil which moves said actuator member longitudinally in a direction dependent on the direction of current flow to roll said segment members and thereby change the status of said first and second valves as a function of said control signal.

16. A pilot valve for receiving fluid from a source at a pressure P at an inlet thereof and for delivering fluid at changeable reduced pressures P1 and P2 at respective ones of a pair of outlets in response to an electrical control signal thereto, said valve comprising:

(a) first fluid restrictor means for receiving the source fluid at an inlet thereof, for passing the source fluid therethrough, and for delivering a portion of the source fluid passing therethrough at an outlet thereof at the reduced pressure P1;

(b) second fluid restrictor means for receiving the source fluid at an inlet thereof, for passing the source fluid therethrough, and for delivering a portion of the source fluid passing therethrough at an outlet thereof at the reduced pressure P2; and (c) valve means having an input adapted to receive the electrical control signal for controlling the amount of source fluid entering said inlets of said first and second fluid restrictor means and thereby said pressures P1 and P2, said valve means including first and second valves disposed over respective ones of said inlets of said restrictor means, said valve means being adapted for moving said first and second valves in combination in response to the electrical control signal such that as one of said valves is moved in a direction tending to increase the flow of fluid therethrough, the other of said valves is moved in a direction tending to decrease the flow fluid therethrough;

wherein said first and second valves each include a flexible strip adapted to be progressively rolled over and off of respective ones of said inlets of said first and second fluid restrictor means;

whrein said first and second valves each includes one of a pair of cylindrical wedge segment members having said strip attached alone one edge and disposed to be rolled across said associated inlet whereby said flexible strip is rolled over and off of said inlet by said member;

and wherein said valve means includes activator means comprising:

an actuator member disposed between said cylindrical wedge segment members and flexibly connected thereto whereby as said actuator member is moved longitudinally said segment members are rolled over said inlets of said first and second fluid restrictor means in combination;

an armature member carried by said actuator member to move in combination therewith;

a pair of C-shaped pole pieces disposed in opposed, facing, spaced relationship to form an air gap with said actuator member and said armature member disposed therebetween and with said armature member disposed within the C-shaped opening of said pole pieces;

a first coil adapted to be connected to receive the electrical control signal disposed within one opposed end of the C-shape of said pole pieces;

a second coil adapted to be connected to receive the electrical control signal disposed within the other opposed end of the C-shape of said pole pieces; and permanent magnet means for producing longitudinally equal and opposite magnetic fluxs in said armature member disposed in respective ones of said pole pieces between said first and second coils, said magnet means being positioned to create equal and opposite magnetic fluxs through said armature when no current is flowing through said coils, said coils being wound such that a d.c. control signal flowing through said coils causes a proportional unbalanced change in said fluxs which moves said armature member and said actuator member longitudinally in a direction dependent on the direction of current flow to roll said segment members and thereby change the status of said first and second valves as a function of said control signal.

17. The pilot valve of claim 16 and additionally comprising:

a sleeve of a non-magnetic metal disposed integral with and mounted to said C-shaped pole pieces to seal and isolate said first and second coils from contact with fluid within said chamber.

18. A pilot valve for receiving fluid from a source at a pressure P at an inlet thereof and for delivering fluid at changeable reduced pressures P1 and P2 at respective ones of a pair of outlets in response to an electrical control signal thereto, said valve comprising:

(a) first fluid restrictor means for receiving the source fluid at an inlet thereof, for passing the source fluid therethrough, and for delivering a portion of the source fluid passing therethrough at an outlet thereof at the reduced pressure P1;

(b) second fluid restrictor means for receiving the source fluid at an inlet thereof, for passing the source fluid therethrough, and for delivering a portion of the source fluid passing therethrough at an outlet thereof at the reduced pressure P2; and (c) valve mans having an input adapted to receive the electrical control signal for controlling the amount of source fluid entering said inlets of said first and second fluid restrictor means and thereby said pressures P1 and P2, said valve means including first and second valves disposed over respective ones of said inlets of said restrictor means, said valve means being adapted for moving said first and second valves in combination in response to the electrical control signal such that as one of said valves is moved in a direction tending to increase the flow of fluid therethrough, the other of said valves is moved in a direction tending to decrease the flow of fluid therethrough;

wherein said first and second valve means each includes one of a pair of arcuate flexible strips adapted to be progressively rolled along a circular path over and off of said inlet thereof; and, said first and second valve means each includes one of a pair of frusto-conical wedge segment members having respective ones of said strips attached along one edge and disposed to be rolled along said path by said members.

19. The pilot valve of claim 18 wherein said activator means comprises:

(a) an actuator member mounted for rotational movement and disposed between said wedge segment members and flexibly connected thereto whereby as said actuator member is rotated said segment members are rolled over said inlets of said first and second valve means in combination;

(b) a coil operably connected to said actuator member to move in combination therewith and adapted to be connected to receive the electrical control signal; and, (c) a pair of permanent magnets disposed in opposed spaced relationship to form an air gap with said coil disposed therein within a field of magnetic flux within said gap whereby a d.c. control signal flowing through said coil causes a rotational force on said coil and actuator member in a direction dependent on the direction of current flow to roll said segment members and thereby change the status of said first and second valve means as a function of said control signal.

20. The pilot valve of claim 19 wherein:

(a) said actuator member is disposed within said chamber; and, (b) said coil is disposed outside of said chamber and is connected to said actuator member by means for sealing said coil from hydraulic fluid in said chamber.

21. The pilot valve of claim 20 wherein:

said coil comprises two skeins of wire disposed in the ends of opposed arms mounted for rotational movement on a torsion tube and connected to said actuator means by a torsion transfer rod disposed within said tube.

* * * * *